April 13, 1943.   A. C. JAMES   2,316,435
BALE GROUPER
Filed April 27, 1942   3 Sheets-Sheet 1
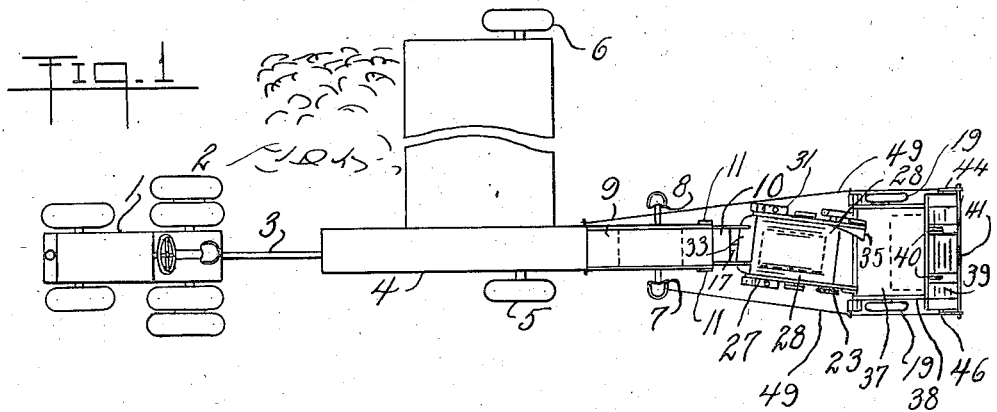
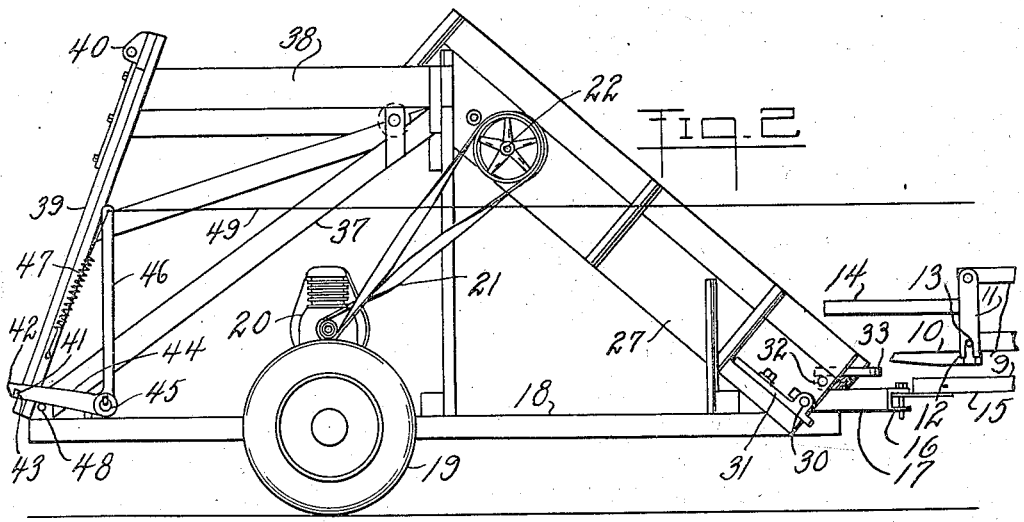
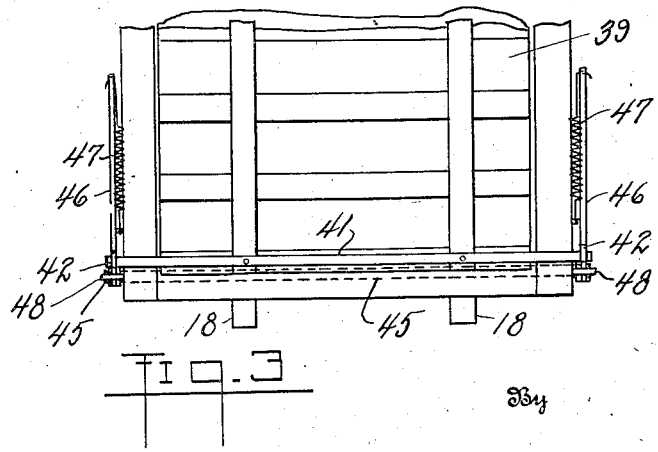
Arthur C. James
Inventor
By
Attorney April 13, 1943. A. C. JAMES 2,316,435
BALE GROUPER
Filed April 27, 1942 3 Sheets-Sheet 2
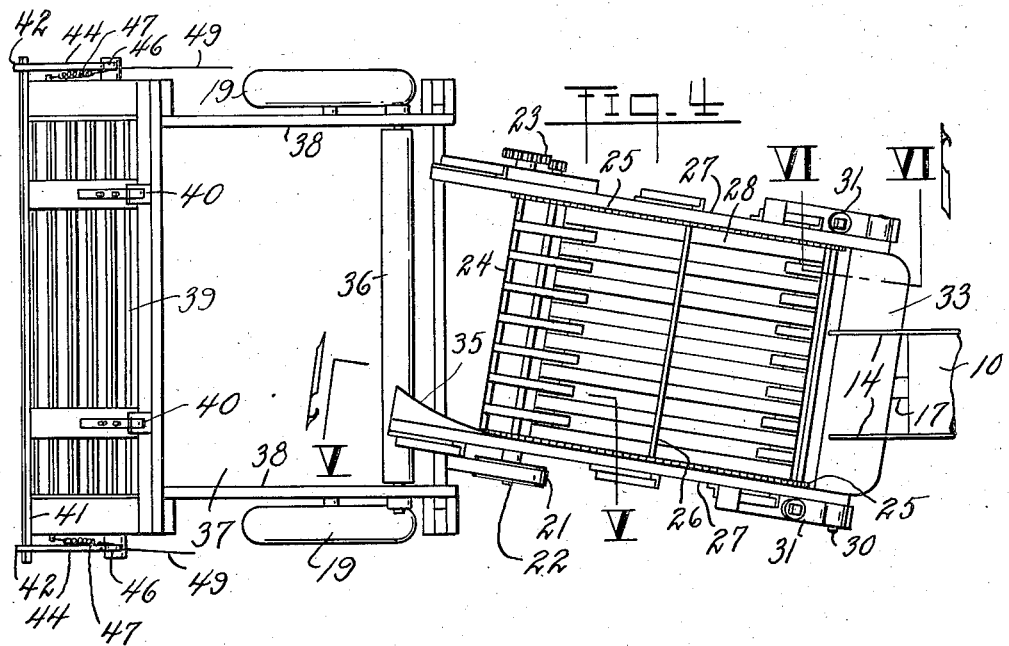
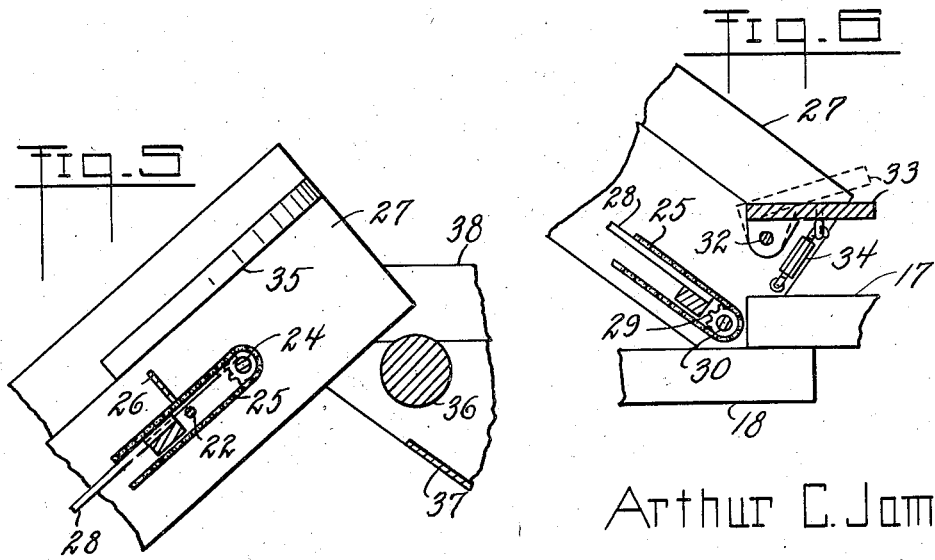
Arthur C. James
Inventor Arthur C. James
Inventor Patented Apr. 13, 1943

2,316,435

UNITED STATES PATENT OFFICE 2,316,435

BALE GROUPER

Arthur C. James, Genoa, Ohio

Application April 27, 1942, Serial No. 440,681

1 Claim. (Cl. 214—9)

This invention relates to assembling articles or bundles for deposit.

This invention has utility in accumulating bales of material from a portable pick-up type of baler.

Referring to the drawings:

Fig. 1 is a plan view showing the general assembly for this device in practice as associated with the pick-up baler and its tractor;

Fig. 2 is a side elevation of the device of the invention herein, showing the elevator and pocket or receiver as trailing from a baler;

Fig. 3 is a fragmentary view from the left of Fig. 2 showing the dump gate of the pocket or receiver;

Fig. 4 is a plan view of the device of Fig. 2, showing the askew position of the elevator as to the pocket;

Fig. 5 is a section on the line V—V, Fig. 4, showing the elevator discharge into the pocket or receiver;

Fig. 6 is a section on the line VI—VI, Fig. 4, showing the bale receiver for the elevator.

Figure 7:
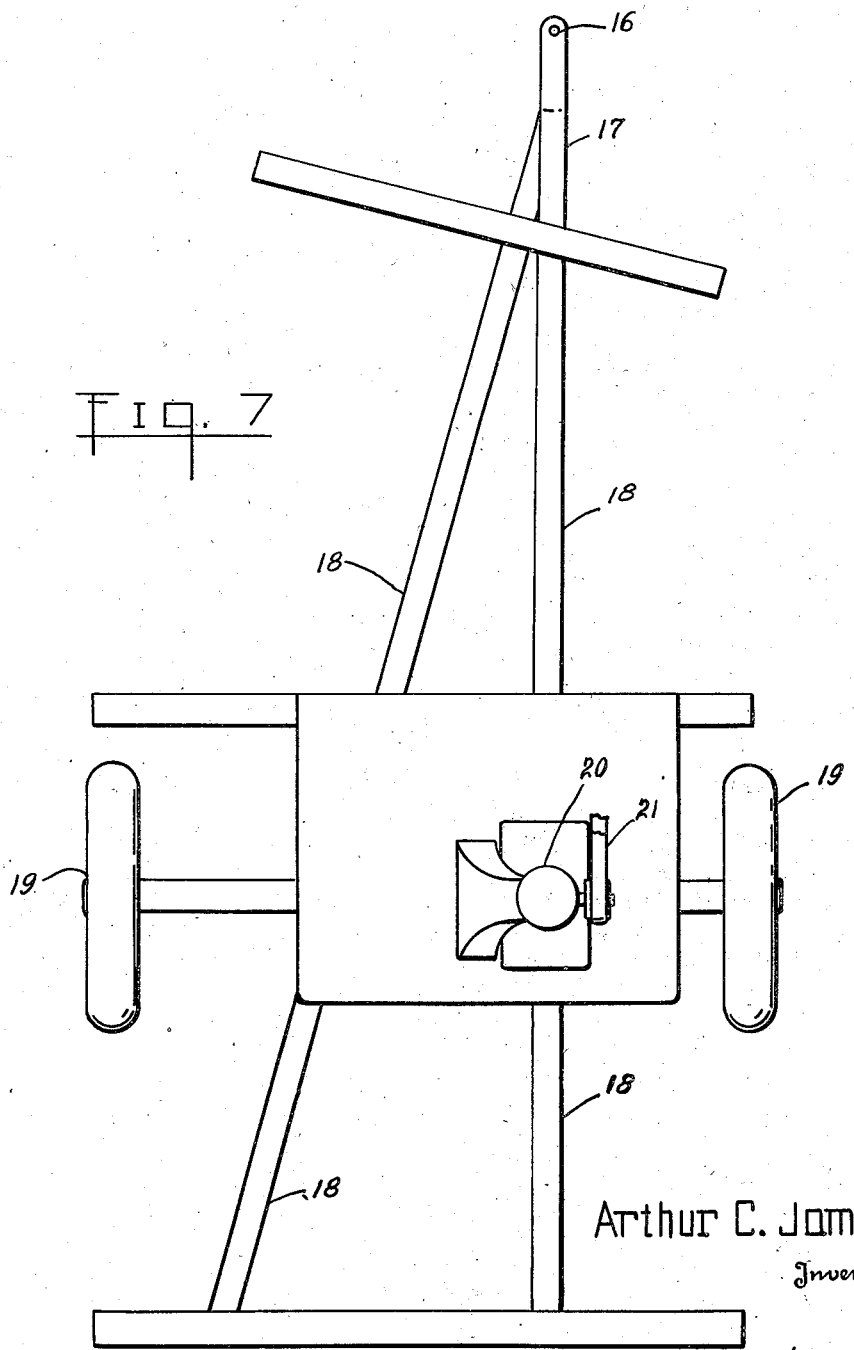
Fig. 7 is a plan view of the chassis of Fig. 4.

Tractor 1 (Fig. 1) may draw in a field along windrow 2 by hitch 3 pick-up baler 4 having ground wheels 5, 6, and bale attendant stations 7, 8. This baler, as progressed along the windrow 2 by the tractor 1, is effective in gathering up the growth afield, whether such be hay, soy beans, alfalfa, straw, or other material. Such material as bound into bundles or bales passes by way 9 having hinged extension 10.

Under the invention herein, from the way 9 terminal legs 11 (Fig. 2) are provided with fork 12 to ride over bolt 13 to permit automatic adjustment between the upper and lower portions 9 of the way. These upright terminal legs 11 intermediate their length are provided with parallel extension arms 14, say of spring material, as guides for directing the completed bale from the pick-up baler over the table 10.

Furthermore, hereunder from such pick-up baler 4, and rigid therewith a tongue 15 to hitch connection 16 provides a readily attachable assembly comprising a vertical axis pivot pin or bolt (Fig. 2) through an eye from the tongue 15 and a pair of clevis-like eyes of trailer arm 17 of the bundle grouper hereunder. This bundle grouper embodies chassis 18, with which the arm 17 is fixed, and pair of ground wheels 19. Between these ground wheels 19 the chassis 18 carries prime mover as gas engine 20 effective through belt 21 to drive shaft 22 and through speed reduction 23 to operate shaft 24 (Figs. 4, 5) to propel sprocket chains 25 carrying flights 26 between guides or sides 27 over slatted elevator portion 28. These sprocket chains 25 (Fig. 6) extend over lower sprocket wheels 29 on shaft 30 having belt tightener adjustment 31 therefor.

Between these sides 27 for the elevator adjacent the lower portion there is pivot shaft 32 for receiving table 33 having adjustable support 34, say of turnbuckle type, to determine the location of this table as below that of the hinged extension 10 for the bale. It is also important in this adjustment for the table 33 that this be sufficient to ride under the extension 10 even at irregularities as encountered afield. The tongue 15 holds the arm 17 against out-of-register up-and-down movement between the extension 10 and the receiving table 33. To care for this condition and for range of different types of balers, it is important to have say at least two inches between the top of this table 33 and the bottom of the extension 10. The location of the hitch connection between the tongue 15 and the trailer arm 17 it is desirable be ample to care for this condition.

In the operation hereunder, this trailer connection or hitch 16 is desirably positioned centrally of the bale discharge from the baler. The directing arms 14 are to give the bale a straight line travel from the baler to the elevator to be engaged by the flights 26. However, this elevator does not extend directly rearward, but is askew so that the bale in endwise travel up this elevator, while received centrally of the elevator, is pitched to reach the top at the upper left and strike projecting guide or cam 35. This has a retarding or delaying action for this side or end of the bale, while the flight 26 as carrying the bale upward tends to orient or turn the bale, so that the bale, in leaving the elevator and striking roller 36, tends sidewise to roll down incline 37 of pocket having sides 38 and to lodge against discharge gate 39 having top hinge 40. This pocket, receiver or chute has its gate 39 normally held closed by cross bar 41 riding under nose 42 into notch 43 of catch arm 44 on pivot 45. This catch arm 44 has angle arm 46 projecting therefrom with tension spring 47 normally holding the arm against stop 48, thereby to be in receiving position to engage the gate 39 as swinging down by gravity after such may be opened. From the upper end of this arm 46 there is operating line 49 to the stations 7, 8, thereby making it convenient for either operator at the baler to pull such line 49 and release the gate 39 from the receiver or pocket so the bale accumulation may discharge afield. As such bales roll out, the gate 39 drops back by gravity for the bar 41 to ride under the nose 42 and lodge in the notch 43, there to be held for a later accumulation as the course afield is continued.

This location for the trailer grouper offset from the baler, is offset away from the pick-up baler direction and thereby deposits the grouped bales afield in clearance way for the tractor and succeeding circuit for a windrow to be clear of the bales in the event such have not been removed in the course of the harvesting operation.

What is claimed and it is desired to secure by Letters Patent is:

The combination with a pick-up baler or the like having a rearward horizontally extending way for a succession of completed bales to pass endwise therealong, of a bale grouper trailer having vertical axis connection centrally of the way, an elevator supported adjacent said connection directed in its ascent to one side of the direction of said way, deflection means mounted near the upper portion of the elevator and toward which the way is directed for supplementing elevator operation to orient the bales or the like from endwise to sidewise direction of progress, and a chute receiver for the bales or the like as they approach sidewise direction of progress.

ARTHUR C. JAMES.